US009036828B2

(12) United States Patent
Schambeck

(10) Patent No.: US 9,036,828 B2
(45) Date of Patent: May 19, 2015

(54) METHOD FOR OUTPUTTING MUSIC INFORMATION IN A VEHICLE

(75) Inventor: Bernhard Schambeck, Woerthsee (DE)

(73) Assignee: Bayerische Motoren Werke Aktiengesellschaft, Muenchen (DE)

( * ) Notice: Subject to any disclaimer, the term of this patent is extended or adjusted under 35 U.S.C. 154(b) by 403 days.

(21) Appl. No.: 13/525,775

(22) Filed: Jun. 18, 2012

(65) Prior Publication Data

US 2012/0257767 A1 Oct. 11, 2012

Related U.S. Application Data

(63) Continuation of application No. PCT/EP2010/068114, filed on Nov. 24, 2010.

(30) Foreign Application Priority Data

Dec. 19, 2009 (DE) ......................... 10 2009 059 680

(51) Int. Cl.
*H04B 1/00* (2006.01)
*H04R 5/02* (2006.01)

(52) U.S. Cl.
CPC ........................................ *H04R 5/02* (2013.01)

(58) Field of Classification Search
CPC .................................... H04B 1/00; H04R 5/02
USPC ........... 381/86, 302, 61; 340/936, 935, 384.3, 340/384.73, 392.3; 701/7, 79, 110
See application file for complete search history.

(56) References Cited

U.S. PATENT DOCUMENTS

| | | | | |
|---|---|---|---|---|
| 6,031,918 | A | 2/2000 | Chahabadi | |
| 7,391,305 | B2 * | 6/2008 | Knoll et al. | 340/438 |
| 8,682,004 | B2 * | 3/2014 | Grigsby et al. | 381/77 |
| 2004/0178893 | A1 * | 9/2004 | Litkouhi et al. | 340/435 |
| 2007/0223728 | A1 * | 9/2007 | Sakamoto et al. | 381/86 |
| 2009/0066499 | A1 | 3/2009 | Bai et al. | |
| 2009/0080672 | A1 | 3/2009 | Smith | |
| 2009/0146799 | A1 * | 6/2009 | Goldstein et al. | 340/463 |
| 2013/0182864 | A1 * | 7/2013 | Takahashi et al. | 381/61 |

FOREIGN PATENT DOCUMENTS

| | | | |
|---|---|---|---|
| DE | 44 30 931 | A1 | 3/1996 |
| DE | 195 09 711 | C2 | 10/1997 |
| KR | 100 267 288 | B1 | 12/2000 |

OTHER PUBLICATIONS

International Preliminary Report on Patentability (PCT/IB/338 & PCT/IB/373) dated Jul. 12, 2012 (two (2) pages).
Written Opinion (PCT/ISA/237) dated May 12, 2011 (six (6) pages).
International Search Report dated May 12, 2011 with English translation (four (4) pages).
German Search Report dated Aug. 30, 2010 with partial English translation (nine (9) pages).

* cited by examiner

*Primary Examiner* — Disler Paul
(74) *Attorney, Agent, or Firm* — Crowell & Moring LLP

(57) ABSTRACT

In a method for outputting music information in a vehicle by way of an audio system having loudspeakers in the front area and rear area of the vehicle, the behavior of the vehicle is determined by use of an acceleration sensor responding to longitudinal accelerations. The loudspeakers arranged in the direction of the respective acceleration are at least preferably activated.

12 Claims, 1 Drawing Sheet

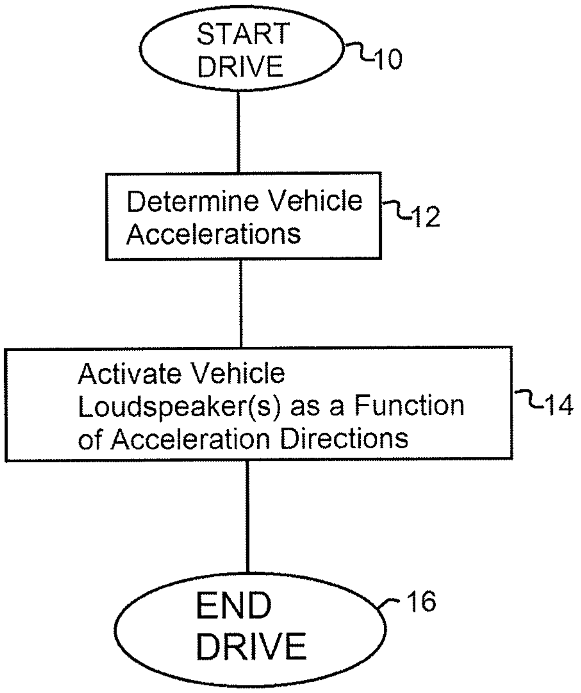
START DRIVE
10
Determine Vehicle Accelerations
12
Activate Vehicle Loudspeaker(s) as a Function of Acceleration Directions
14
END DRIVE
16

METHOD FOR OUTPUTTING MUSIC INFORMATION IN A VEHICLE

CROSS-REFERENCE TO RELATED APPLICATIONS

This application is a continuation of PCT International Application No. PCT/EP2010/068114, filed Nov. 24, 2010, which claims priority under 35 U.S.C. §119 from German Patent Application No. DE 10 2009 059 680.1, filed Dec. 19, 2009, the entire disclosures of which are herein expressly incorporated by reference.

BACKGROUND AND SUMMARY OF THE INVENTION

The invention relates to a process for the output of music information in a vehicle.

A method is known for the output of music information by use of an audio device in a vehicle, whereby the driver's behavior is detected by means of data of one or more driving systems and/or one or more comfort systems of the vehicle, and whereby, for different types of behavior of the driver and/or traffic situations, one piece of music respectively is stored as music information in a table. In the event of the presence of the respective driving behavior and/or of the respective traffic situation, this music information is played back by way of the audio device.

In contrast to the above, it is an object of the invention to improve the attention value of the information for the output for the driver.

The invention achieves this and other objects by providing a method for outputting music information in a vehicle by way of an audio device having loudspeakers in front and rear areas. The behavior of the vehicle is detected by an acceleration sensor, which responds to longitudinal acceleration. At least those loudspeakers which are mounted in the direction of the respective acceleration are preferably activated.

The invention is aimed at controlling playback of audio information as a function of the longitudinal dynamics of the vehicle movement. As in the known method, the audio information may be a piece of music or a tone sequence which is generated by a tone generator.

It is an object of the invention to provide the driver with indirectly noticeable support for his further behavior. For this purpose, the playback characteristic of the audio device is adapted as a function of the longitudinal dynamics of the vehicle movement. If the audio device contains one loudspeaker arranged in the front in the driving direction and one loudspeaker arranged in the rear in the driving direction, one of the loudspeakers is activated in a dominant manner in the case of an increase/decrease of the vehicle speed. The one loudspeaker may become louder than without a longitudinal acceleration while the volume of the other loudspeaker is unchanged, or it may become louder while the volume of the other loudspeaker is simultaneously reduced. In each case, the driver's and the passenger's attention is acoustically clearly drawn to the special driving dynamics. This information is intuitively understood because the local assignment of the dominant loudspeaker and of the acceleration direction is unambiguous.

The same applies if two and, as nowadays is often customary, even more than two loudspeakers are present in the front and/or the rear in the driving direction. The loudspeakers arranged in the front, if required, are activated to a greater degree in a joint manner. A corresponding situation applies to two and more loudspeakers arranged in the rear in the case of an opposite longitudinal acceleration of the vehicle.

As described for a longitudinal acceleration, the invention can also be expanded to the case of a lateral acceleration of the vehicle. One or more loudspeakers arranged laterally in the interior of the vehicle are preferably activated during a lateral acceleration of the vehicle. Here also, the driver's and passenger's attention is acoustically clearly drawn to the special driving dynamics.

Instead of using a discrete acceleration sensor, the information concerning a lateral acceleration with respect to the direction and intensity can also be obtained from information already existing concerning a cornering at a defined speed, for example, from the output signals of the wheel rotation sensors, which are used within the framework of an antilock system.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE is a flowchart illustrating an exemplary method in accordance with the present invention.

DETAILED DESCRIPTION OF THE DRAWING

The single FIGURE is an exemplary flowchart illustrating the operating principle of the present invention. The method starts (10) by determining one or more vehicle accelerations, such as longitudinal and lateral accelerations (12). As a function of at least one of the vehicle accelerations directions, loudspeakers in the vehicle are preferably activated (14). The method ends when the vehicle is no longer being driven (16).

The basic principle of the invention as discussed will now be explained by way of an example. Let it be assumed that the driver is driving in good weather in a perceptibly relaxed manner along a moderately winding country road at an appropriate and uniform speed. The driver's location is, for example, determined by way of the amplitudes, the speed and the speed changes of his steering movements: A "vivacious" piece of music is played at an easily audible volume. Corresponding to the barely perceptible lateral acceleration operations of the vehicle, the lateral loudspeakers are also differently activated in an imperceptible or at least hardly perceptible manner.

The situation is different, however, in the case of a drive during which the driver is perceptibly driving erratically in heavy and congested traffic. In contrast to the previously considered case, his steering motions are significantly less steady, and the vehicle speed and vehicle direction are subject to considerable changes. Thus, the playback of the respective piece of music by the loudspeakers arranged in the direction of the respectively occurring acceleration is also subject to considerable changes.

In the case of a significant increase of the speed without any change in direction, the rear loudspeakers will become louder; a subsequent right-hand turn leads to a volume increase of the loudspeakers arranged laterally on the left; a subsequent left-hand turn, in each case, again without a change of speed, is perceived by louder loudspeakers on the right-hand side of the vehicle, etc.

Left-hand turns, while the speed is increasing, lead to loud loudspeakers in the rear and on the right, etc.

In all cases, the change of the location of the dominant music playback has the purpose of influencing the driver with respect to improving his driving performance. The driving performance can be changed in the sense of optimizing consumption, of optimizing dynamics or of improving driving safety. The consumption is optimized and the driving safety is improved in that the loudspeakers situated in the direction of the acceleration are activated in an increased fashion. Louder loudspeakers in the rear have the effect that the driver moves his foot from the accelerator pedal, i.e. reduces the longitudinal acceleration. Increasingly louder loudspeakers on the right-hand vehicle side have the effect that the driver reduces the cornering speed with the result of a volume reduction on the right side. In each case, a contribution is made to reducing the energy consumption and to increasing traffic safety.

The invention also contributes to making the driving experience subjectively perceptible. The driving-dynamic impression—the experiencing of the driving behavior—can be experienced by an additional sense (hearing). In a special SPORTY mode of the vehicle, for example, the joy of driving can be increased when, for example, a perfectly driven turn becomes acoustically pleasantly perceptible to the driver by a harmonic shifting of the sound information. Parameters for a perfectly driven turn are, for example, a braking point-in-time, cornering stability, turn-entering speed, turn-exiting speed, steering corrections, oversteering, understeering, etc. If these parameters are not optimally coordinated for the respective cornering or accelerating drive, these aspects will experienced by the driver in a correspondingly negative fashion by way of the sound information. Unsteady steering, oversteering/understeering, become audible, for example, by a non-uniform, distorted shifting of the acoustic playback during cornering. The sound information therefore reflects a subjective evaluation of the driving behavior.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for outputting music information in a vehicle comprising the acts of:

outputting audio information in the vehicle via at least one front loudspeaker and at least one rear loudspeaker;

determining an acceleration behavior of the vehicle using an acceleration sensor that responds to longitudinal accelerations of the vehicle; and continuing to output the audio information, following said determining the acceleration behavior, by activating in a dominant manner one of the at least one front loudspeaker and the at least one rear loudspeaker that is based on a direction of the determined acceleration behavior.

2. The method according to claim 1, wherein two loudspeakers respectively arranged on both sides of the vehicle in front and rear areas are at least activated in a joint manner.

3. The method according to claim 1, further comprising the act of:

determining the acceleration behavior of the vehicle using an acceleration sensor that responds to lateral accelerations.

4. The method according to claim 1, further comprising the acts of:

determining the acceleration behavior of the vehicle using an acceleration sensor that responds to lateral accelerations; and activating in the dominant manner one of the at least one front loudspeaker and the at least one rear loudspeaker that is arranged opposite to the direction of the determined acceleration behavior.

5. The method according to claim 1, wherein an extent of the activation is a function of a value of the determined acceleration behavior.

6. The method according to claim 3, wherein an extent of the activation is a function of a value of the determined acceleration behavior.

7. A method for outputting music information in a vehicle comprising the acts of:

outputting audio information in the vehicle via at least one front loudspeaker and at least one rear loudspeaker;

determining an acceleration behavior of the vehicle using an acceleration sensor that responds to longitudinal accelerations of the vehicle; and continuing to output the audio information, following said determining the acceleration behavior, by activating in a dominant manner one of the at least one front loudspeaker and the at least one rear loudspeaker that is opposite to a direction of the determined acceleration behavior.

8. The method according to claim 7, wherein two loudspeakers respectively arranged on both sides of the vehicle in front and rear areas are at least activated in a joint manner.

9. The method according to claim 7, further comprising the act of:

determining the acceleration behavior of the vehicle using an acceleration sensor that responds to lateral accelerations.

10. The method according to claim 7, further comprising the acts of:

determining the acceleration behavior of the vehicle using an acceleration sensor that responds to lateral accelerations; and activating in the dominant manner one of the at least one front loudspeaker and the at least one rear loudspeaker that is arranged opposite to a direction of the determined acceleration behavior.

11. The method according to claim 7, wherein an extent of the activation is a function of a value of the determined acceleration behavior.

12. The method according to claim 9, wherein an extent of the activation is a function of a value of the determined acceleration behavior.

* * * * *